US010075438B2

(12) United States Patent
Truskovsky et al.

(10) Patent No.: US 10,075,438 B2
(45) Date of Patent: *Sep. 11, 2018

(54) METHODS AND SYSTEMS FOR SERVER-INITIATED ACTIVATION OF DEVICE FOR OPERATION WITH SERVER

(71) Applicant: BlackBerry Limited, Waterloo (CA)

(72) Inventors: Alexander Truskovsky, Waterloo (CA); Daryl Joseph Martin, Kitchener (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,226

(22) Filed: Jun. 6, 2016

(65) Prior Publication Data
US 2016/0285869 A1 Sep. 29, 2016

Related U.S. Application Data

(63) Continuation of application No. 13/861,510, filed on Apr. 12, 2013, now Pat. No. 9,363,669.

(51) Int. Cl.
G06F 15/16 (2006.01)
H04L 29/06 (2006.01)
(Continued)

(52) U.S. Cl.
CPC .......... *H04L 63/0869* (2013.01); *H04L 47/70* (2013.01); *H04L 63/0823* (2013.01);
(Continued)

(58) Field of Classification Search
CPC .... H04W 12/06; G06F 21/6218; H04L 63/08; H04L 63/102
(Continued)

(56) References Cited

U.S. PATENT DOCUMENTS

2002/0126850 A1* 9/2002 Allen .................... H04L 9/0825
380/277
2005/0079863 A1* 4/2005 Macaluso ......... H04M 1/72525
455/419
(Continued)

FOREIGN PATENT DOCUMENTS

CA 2732568 A1 8/2011
CA 2741164 A1 11/2011
(Continued)

OTHER PUBLICATIONS

"TrustSec How-To Guide: Using Certificates for Differentiate Access", http://www.cisco.com/en/US/solutions/collateral/ns414/ns742/ns744/docs/howto_60_byod_certificates.pdf, Aug. 27, 2012.
(Continued)

*Primary Examiner* — Evans Desrosiers
(74) *Attorney, Agent, or Firm* — Ridout and Maybee LLP

(57) ABSTRACT

Methods and systems for enabling activation of a wireless communication device to operate with a server on a wireless communication network. An activation request to establish a wireless communication service relationship between the device and the server is pushed from the server to the device. After the device verifies the server, a mutually authenticated communication session is established between the device and the server for activation of the device on the server.

20 Claims, 5 Drawing Sheets

(51) Int. Cl.
*H04W 12/06* (2009.01)
*H04L 29/08* (2006.01)
*H04L 12/911* (2013.01)
*H04W 88/02* (2009.01)

(52) U.S. Cl.
CPC .............. *H04L 63/10* (2013.01); *H04L 67/04* (2013.01); *H04W 12/06* (2013.01); *H04L 63/1458* (2013.01); *H04W 88/02* (2013.01)

(58) Field of Classification Search
USPC ......... 713/168–174, 182–186, 202; 709/206, 709/225, 229, 249, 389; 726/2–8
See application file for complete search history.

(56) References Cited

U.S. PATENT DOCUMENTS

| | | |
|---|---|---|
| 2008/0260149 A1 | 10/2008 | Gehrmann |
| 2010/0088749 A1* | 4/2010 | Steeples .............. H04L 63/0853 726/4 |
| 2010/0311391 A1 | 12/2010 | Siu et al. |
| 2011/0210171 A1 | 9/2011 | Brown et al. |
| 2011/0294484 A1 | 12/2011 | Martin et al. |
| 2012/0040654 A1 | 2/2012 | Martin et al. |
| 2012/0260095 A1 | 10/2012 | Von Hauck et al. |

FOREIGN PATENT DOCUMENTS

| | | |
|---|---|---|
| CA | 2747930 A1 | 12/2012 |
| EP | 2364043 A1 | 9/2011 |
| EP | 2391148 A2 | 11/2011 |

OTHER PUBLICATIONS

"Enterprise Activation FAQ", http://us.blackBerry.com/content/dam/blackberry/pdf/support/northAmerica/english/Enterprise_Activation_FAQ.pdf.

Fortinet, "FortiAuthenticator:User Identity Management and Single Sign-On", http://www.fortinet.com/sites/default/files/productdatasheets/FortiAuttienticator-1000C.pdf.

Diodati, Mark, "Mobile Device Certificate Enrollment: Are You Vulnerable?", http://blogs.gartner.com/mark-diodati/2012/07/02/mobile-device-certificate-enrollment-are . . . , Feb. 8, 2013.

Blackberry, "How to Activate a BlackBerry Smartphone Using BlackBerry Enterprise", http://btsc.webapps.blackberry.com/btsc/viewdocument.do;jsessionid=33A84E173AD430B . . . , Feb. 8, 2013.

"How to Activate a BlackBerry Using Wireless Enterprise Activation", http://support.sherweb.com/Faqs/show/how-to-activate-a-blackberry-using-wireless-enterpri . . . , Feb. 8, 2013.

Martin, Chris, "iOS Certificate Based Authentication: Technical Brief on Using Certificates to Authenticae iOS Devices on the ProxySG", Jan. 8, 2011.

Blackberry, "Is There a Way to Push Initiate Enterprise Activation: BlackBerry Forums Support", http://www.blackberryforums.com/bes-admin-corner/42514-there-way-push-initiate-enter . . . , Oct. 25, 2013.

European Search Report, dated Sep. 26, 2014, European Application No. 14164443.5.

* cited by examiner

METHODS AND SYSTEMS FOR SERVER-INITIATED ACTIVATION OF DEVICE FOR OPERATION WITH SERVER

RELATED APPLICATION DATA

The present application is a continuation of U.S. patent application Ser. No. 13/861,510, filed Apr. 12, 2013, the content of which is incorporated herein by reference.

TECHNICAL FIELD

The present disclosure relates generally to mobile communication devices, and more particularly to methods and systems for activation of mobile communication devices for operation with a server, including an enterprise server.

BACKGROUND

Wireless communication devices often need to be provided with service data in order to connect to a wireless communication network, such as a wireless voice and/or data network, and to use the wireless services available on such networks. The process by which a service relationship is established between a wireless communication device and a data server may be referred to as "activation" in the sense that establishing a service relationship between the wireless communication device and the server may activate wireless services provided by the server for the wireless communication device. This process may sometimes be referred to as "provisioning"; however, this usage of the term is unrelated to the "provisioning" process which typically occurs at the wireless carrier level.

Activation of a wireless communication device for operation with a server is typically required for a device (e.g., a new device) which does not have an existing service relationship with the server, and may be required in other circumstances such as during device switch operations in which the device associated with a wireless network subscription is switched (for example, when a SIM card is swapped between wireless communication devices) or when the service data affecting the wireless communication devices or the wireless data server changes. It may be desirable for activation of the device on the server to take place over a secure communication channel, for example to prevent unauthorized users from activating a device on the server (e.g., in a denial of service attack).

BRIEF DESCRIPTION OF THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

Figure 1:
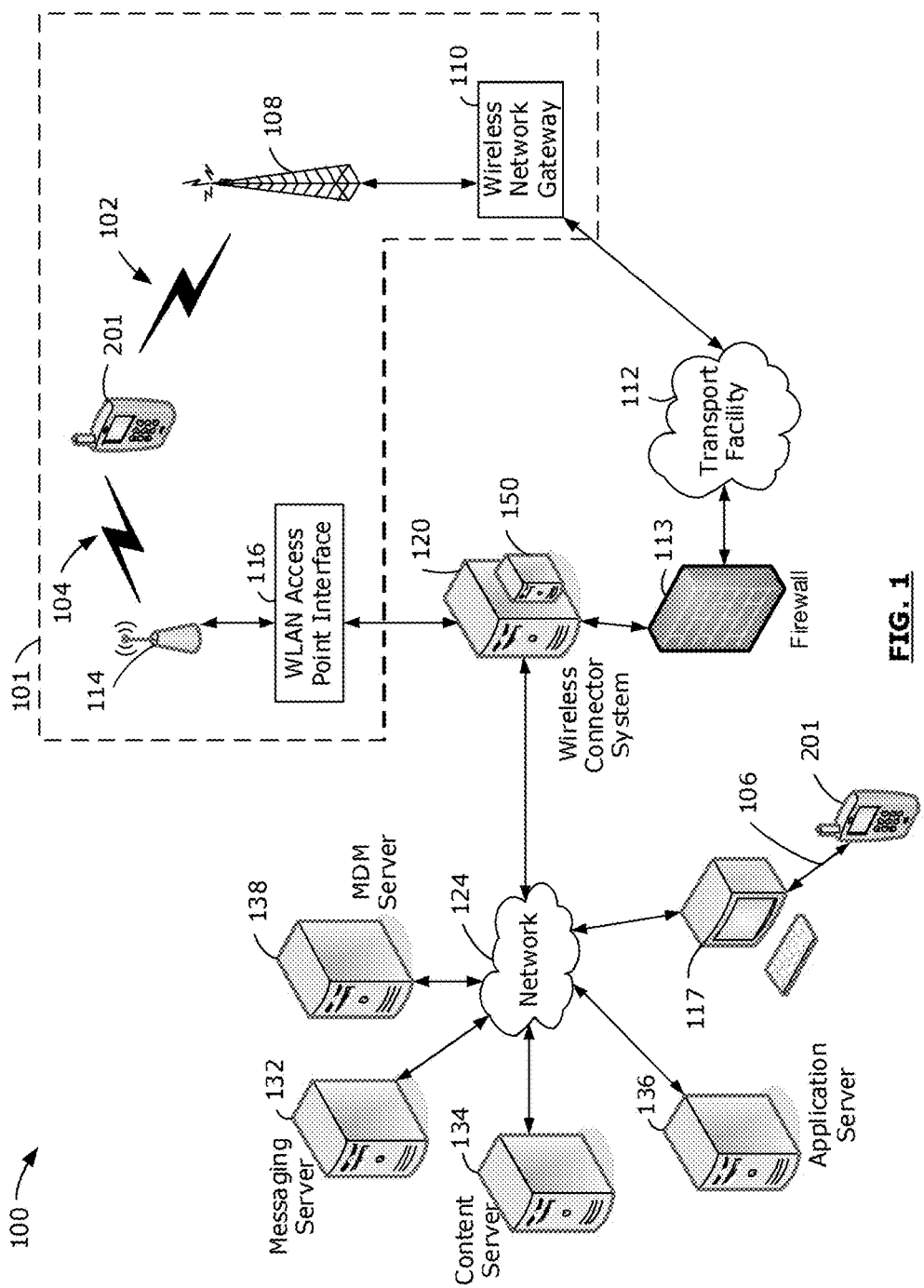
FIG. 1 is a block diagram illustrating a communication system including a wireless device in which example embodiments of the present disclosure can be applied.

In accordance with one embodiment of one aspect of the present disclosure, there is provided a method for a wireless communication device, comprising: receiving, by a device from a server, an activation request to establish a wireless communication service relationship between the device and the server, wherein the activation request is pushed from the server to the device in absence of any prior communication being sent from the device to the server; attempting, by the device, to verify identity information of the server; after the identity information of the server is verified by the device and input to accept the activation request is received by the device, establishing a mutually authenticated communication session between the device and the server; and establishing, using the mutually authenticated communication, the wireless communication service relationship between the device and the server.

In accordance with one embodiment of another aspect of the present disclosure, there is provided a wireless communication device, comprising: a processor; a memory coupled to the processor, the memory storing executable instructions that, when executed by the processor, cause the wireless communication device to perform the above-described method.

In accordance with one embodiment of a further aspect of the present disclosure, there is provided a non-transitory machine readable medium having tangibly stored thereon executable instructions for execution by a processor of a wireless communication device configurable to operate with a server on a communication network that, when executed by the processor, cause the wireless communication device to perform the above-described method.

In accordance with one embodiment of a yet further aspect of the present disclosure, there is provided a method for a server, comprising: pushing to a device an activation request to establish a wireless communication service relationship between the device and the server, wherein the activation request is pushed from the server to the device in absence of any prior communication being sent from the device to the server; after notification that the activation request has been accepted, establishing a mutually authenticated communication session between the device and the server; and establishing, using the mutually authenticated communication, the wireless communication service relationship between the device and the server.

In accordance with one embodiment of a yet further aspect of the present disclosure, there is provided a server, comprising: a processor; a memory coupled to the processor, the memory storing executable instructions that, when executed by the processor, cause the server to perform the above-described method.

In accordance with one embodiment of a yet further aspect of the present disclosure, there is provided a non-transitory machine readable medium having tangibly stored thereon executable instructions for execution by a processor of a server that, when executed by the processor, cause the server to perform the above-described method.

In accordance with other example aspects of the present disclosure, there is provided a method for enabling activation of a wireless communication device to operate with a server on a wireless communication network, where the method may include: receiving an activation request from the server, the activation request being authenticated with a signature signed with a server certificate, the server certificate including server identity information; verifying the activation request by verifying the server identity information and the signature; and, only after receiving input to accept the activation request, establishing a mutually authenticated communication session with the server for activation of the device on the server, the mutually authenticated communication session being authenticated by a device certificate from the device and the same or different server certificate.

In accordance with other example aspects of the present disclosure, there is provided a wireless communication device configurable to operate with a server on a communication network, the device comprising a processor configured to execute instructions to cause the device to: receive an activation request from the server, the activation request being authenticated with a signature signed by a server certificate, the server certificate including server identity information; verify the activation request by verifying the server identity information and the signature; and, only after receiving input to accept the activation request, establish a mutually authenticated communication session with the server for activation of the device on the server, the mutually authenticated communication session being authenticated by a device certificate and the same or different server certificate.

In accordance with other example aspects of the present disclosure, there is provided a method for enabling activation of a wireless communication device to operate with a server on a wireless communication network, the method may include: pushing an activation request to the device, the activation request being authenticated by a signature signed by a server certificate, the server certificate including server identity information; and, after receiving from the device an indication to proceed with activation, establishing a mutually authenticated communication session with the device for activation of the device on the server, the mutually authenticated communication session being authenticated by a device certificate from the device and the same or different server certificate.

Reference will now be made to the accompanying drawings which show example embodiments of the present disclosure. For simplicity and clarity of illustration, reference numerals may be repeated among the figures to indicate corresponding or analogous elements. Numerous details are set forth to provide an understanding of the example embodiments described herein. The example embodiments may be practised without some of these details. In other instances, suitable variations to the disclosed methods, procedures, and components have not been described in detail to avoid obscuring the example embodiments described, but are within the scope of the present disclosure. The disclosure is not to be considered as limited to the scope of the example embodiments described herein.

FIG. 1 shows in block diagram form an example communication system 100 in which example embodiments of the present disclosure can be implemented. The communication system 100 may comprise one or more wireless communication devices (referred to hereinafter as "wireless devices" for convenience) 201 which may be connected to the remainder of system 100 in any of several different ways. Accordingly, several instances of the wireless device 201 are depicted in FIG. 1 employing different example ways of connecting to system 100. The wireless device 201 will be described in further detail below. The wireless device 201 may be connected to a wireless communication network 101 which may comprise one or more of a Wireless Wide Area Network (WWAN) 102, a Wireless Local Area Network (WLAN) 104, and/or other suitable network arrangements. In some examples, the wireless device 201 may be configured to communicate over both the WWAN 102 and WLAN 104, and may be configured to permit roaming between these networks 102, 104. In some examples, the wireless network 101 may comprise multiple WWANs 102 and/or WLANs 104.

The WWAN 102 may be implemented as any suitable wireless access network technology. By way of example, but not limitation, the WWAN 102 may be implemented as a wireless network that may include one or more transceiver base stations 108 (one of is shown in FIG. 1 as an example). Each of the base station(s) 108 may provide wireless Radio Frequency (RF) coverage to a corresponding area or cell. The WWAN 102 may be operated by a wireless network service provider that may provide a subscription package to a user of the wireless device 201. In some examples, the WWAN 102 may conform to one or more of the following wireless network types: Mobitex Radio Network, DataTAC, Global System for Mobile Communication (GSM), General Packet Radio System (GPRS), Time Division Multiple Access (TDMA), Code Division Multiple Access (CDMA), Cellular Digital Packet Data (CDPD), integrated Digital Enhanced Network (iDEN), Evolution-Data Optimized (Ev-DO) CDMA2000, Enhanced Data rates for GSM Evolution (EDGE), Universal Mobile Telecommunication Systems (UMTS), High-Speed Downlink Packet Access (HSDPA), IEEE 802.16e (which may also be referred to as Worldwide Interoperability for Microwave Access or "WiMAX"), IEEE 802.16m (which may also be referred to as Wireless Metropolitan Area Networks or "WMAN"), 3GPP Long Term Evolution (LTE), LTE Advanced, IEEE 802.20 (which may also be referred to as Mobile Broadband Wireless Access or "MBWA") or other suitable network types. Although WWAN 102 may be described as a "Wide-Area" network, that term is intended herein to incorporate other similar technologies for providing coordinated service wirelessly over an area larger than that covered by typical WLANs.

The WWAN 102 may further comprise one or more wireless network gateways 110 which may connect the wireless device 201 to one or more transport facilities 112, and through the transport facility(ies) 112 to a wireless connector system 120. The transport facility(ies) 112 may include one or more private networks or lines, the public Internet, a virtual private network, or any other suitable network. The wireless connector system 120 may be operated, for example, by an organization or enterprise such as a corporation, university, or governmental department, and may allow access to a network 124 such as a private network (also known as an internal or enterprise network) and any shared resources of the private network, and/or the Internet. In some examples, the wireless connector system 120 may be operated by a mobile network service provider.

The wireless network gateway 110 may provide an interface between the wireless connector system 120 and the WWAN 102, which may facilitate communication between one or more wireless devices 201 and other devices (not shown) connected, directly or indirectly, to the WWAN 102. Accordingly, communications sent via the wireless device 201 may be transported via the WWAN 102 and the wireless network gateway 110 through transport facility(ies) 112 to the wireless connector system 120. Communications sent from the wireless connector system 120 may be received by the wireless network gateway 110 and transported via the WWAN 102 to the wireless device 201.

The WLAN 104 may comprise a wireless network which, in some embodiments, may conform to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e, IEEE 802.16m or IEEE 802.20. The WLAN 104 may include one or more wireless RF access points 114 (one of which is shown in FIG. 1) that may collectively provide a WLAN coverage area.

The WLAN 104 may be a personal network of the user, an enterprise network, or a hotspot offered by an Internet service provider (ISP), a wireless network service provider, or a property owner in a public or semi-public area, for example. The access point(s) 114 may be connected to an access point interface 116 which may connect to the wireless connector system 120 directly (for example, if the access point(s) 114 is part of an enterprise WLAN 104 in which the wireless connector system 120 resides), or indirectly (e.g., via the transport facility(ies) 112), such as if the access point(s) 114 is a personal Wi-Fi network or Wi-Fi hotspot (in which case a mechanism for securely connecting to the wireless connector system 120, such as a virtual private network (VPN), may be required). The access point interface 116 may provide translation and routing services between the access point(s) 114 and the wireless connector system 120 to facilitate communication, directly or indirectly, with the wireless connector system 120.

The wireless connector system 120 may be implemented as one or more servers (one is shown in FIG. 1), and may be located behind a firewall 113. The wireless connection system 120 may include a certificate authority 150. Although described as being part of the wireless connector system 120, in some examples the certificate authority 150 may be a separate system and may be separately accessible by the wireless device 201 through a public network, with or without management by the wireless connector system 120, for example. The wireless connector system 120 may manage communications, such as email messages, to and from a set of managed wireless devices 201. The wireless connector system 120 may provide administrative control and management capabilities over users and wireless devices 201 which may connect to the wireless connector system 120.

The wireless connector system 120 may allow the wireless device 201 to access the network 124 (e.g., a corporate network) and connected resources and services such as one or more messaging servers 132, one or more content servers 134 for providing content such as Internet content or content from an organization's internal servers to the mobile devices 201 in the wireless network 101, one or more application servers 136 for implementing server-based applications, one or more mobile device management (MDM) server 138 for providing wireless services (e.g., corporate wireless services, enterprise services and/or other device management services), and the like. In some examples, the MDM server 138 may be a private corporate server, and may also be referred to as an enterprise server.

The wireless connector system 120 may provide a secure exchange of data (e.g., communications and other messages such as email messages, personal information manager (PIM) data, and IM data) with the wireless device 201. In some embodiments, communications between the wireless connector system 120 and the wireless device 201 may be encrypted. In some embodiments, communications may be encrypted using any suitable encryption method, such as a symmetric encryption key implemented using Advanced Encryption Standard (AES) or Triple Data Encryption Standard (Triple DES) encryption. Private encryption keys may be generated in a secure, two-way authenticated environment and may be used for both encryption and decryption of data.

The wireless network gateway 110 may be adapted to send data packets received from the wireless device 201 over the WWAN 102 to the wireless connector system 120. The wireless connector system 120 may then send the data packets to the appropriate connection point such as a messaging server 132, content server 134, application server 136 or MDM server 138. Conversely, the wireless connector system 120 may send data packets received, for example, from the messaging server 132, content server 134, application server 136 or MDM server 138 to the wireless network gateway 110 which may then transmit the data packets to the destination wireless device 201. The access point interface 116 of the WLAN 104 may provide similar sending functions between the wireless device 201, the wireless connector system 120 and a network connection point such as a messaging server 132, content server 134, application server 136 or MDM server 138.

The network 124 may comprise one or more networks, such as a private local area network, private corporate network, metropolitan area network, wide area network, the public Internet or combinations thereof and may include virtual networks constructed using any of these, alone, or in combination.

One or more computers 117 (one is shown in FIG. 1), such as a desktop or notebook computer, may also be connected to the network 124, such as by a wired or wireless communication link. A wireless device 201 may connect to the wireless connector system 120 using a computer 117 via the network 124 rather than using the WWAN 102 or WLAN 104. A communication link 106 may be provided for exchanging information between the wireless device 201 and a computer 117 connected to the wireless connector system 120. The link 106 may comprise one or both of a physical interface for a wired communication link and a wireless communication interface (e.g., a short-range wireless communication interface, such as a Bluetooth® interface) for a wireless communication link.

The communication system 100 may be implemented, at least in part, as a cloud-based solution in which computer(s) 117 and wireless device(s) 201 may share access to the network resources, e.g. messaging server 132, content server 134, application server 136, MDM server 138, certificate authority 150, software and other data and information. In a cloud implementation, the network 124 may be implemented using the Internet rather than a private network, although the network 124 may be viewed as a private cloud rather than a public cloud in the form of public Internet based services.

Access to cloud-based applications (referred to hereinafter as "cloud applications"), such as messaging applications, may be through, for example, a web browser or thin client on the computer 117 and/or wireless device 201. The majority of the processing logic and data of cloud applications may be stored on the shared resources (e.g., servers) which may be at a remote location. Cloud applications may allow access from nearly any computer 117 and/or wireless device 201 having access to the network 124 (e.g., the Internet). Cloud applications may facilitate a converged infrastructure and shared services, which in turn may facilitate deployment of applications with easier manageability and less maintenance.

The above-described communication system is provided for the purpose of illustration only, and the above-described communication system comprises an example possible communication network configuration out of a multitude of possible configurations for use with the wireless device 201. The teachings of the present disclosure may be employed in connection with any other type of network and associated devices that are effective in implementing or facilitating wireless communication. Variations of the communication system are intended to fall within the scope of the present disclosure. For example, while the wireless device 201 has been described as having a wireless connector system 120 in the above-described embodiments, the wireless connector system 120 may be omitted in other embodiments. Some or all of the functions of the wireless connector system 120 may be implemented by various communication endpoints, or possibly a cloud-based resource such as a cloud-based server.

Figure 2:
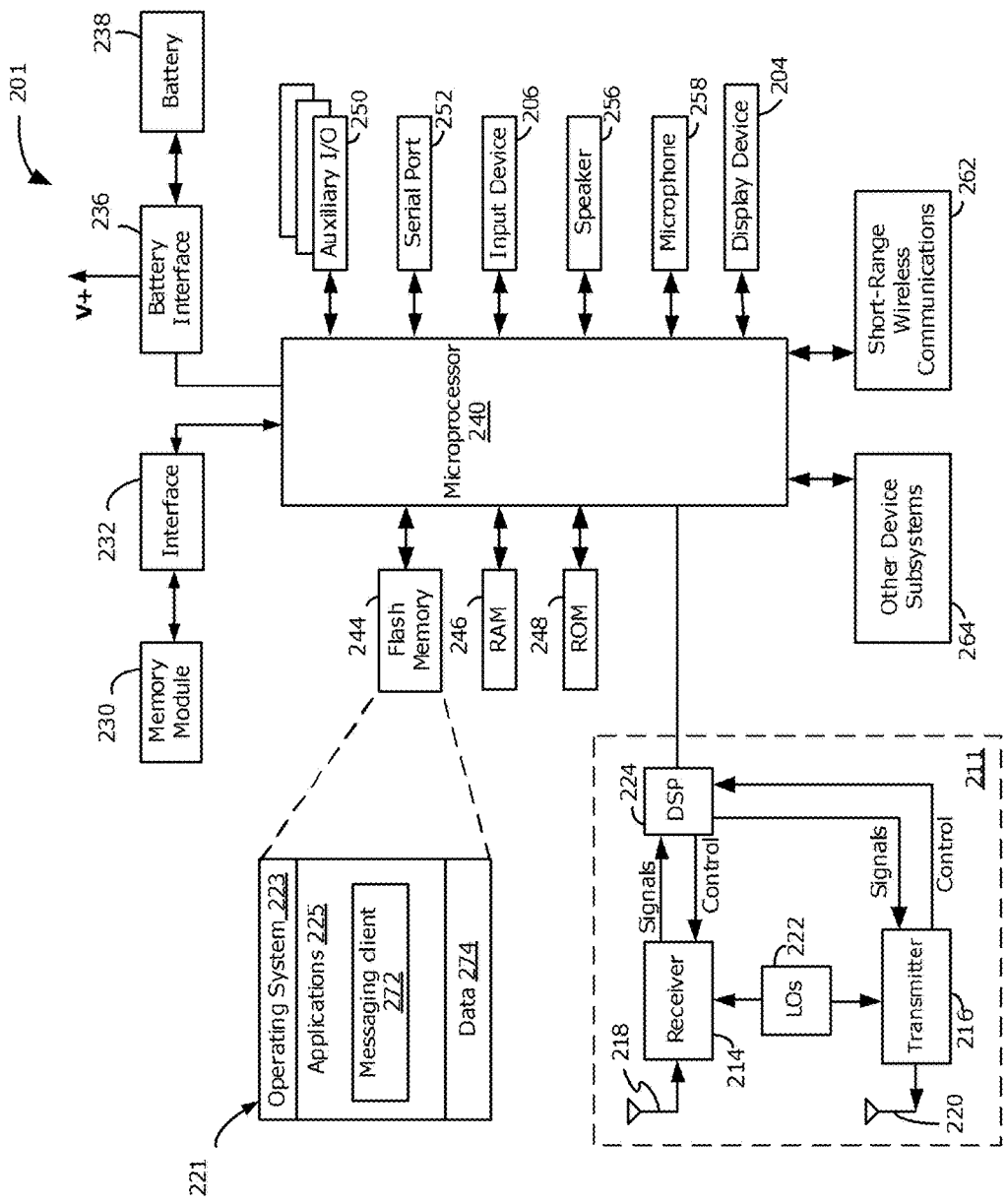
FIG. 2 is a block diagram illustrating a wireless device in accordance with an example embodiment of the present disclosure.

FIG. 2 illustrates an example wireless device 201 in which example embodiments described in the present disclosure can be applied. The wireless device 201 may be a two-way communication device having data and voice communication capabilities, and the capability to communicate with other computer systems, for example, via the Internet. Depending on the functionality provided by the wireless device 201, in various embodiments the device 201 may be a multiple-mode communication device configured for both data and voice communication. The wireless device 201 may be referred to as a mobile communication device, a mobile device, a smartphone, a personal digital assistant, a cellular telephone, a tablet device or a palm device, for example.

The wireless device 201 may include a rigid case (not shown) housing the components of the device 201. The internal components of the device 201 may be constructed on a printed circuit board (not shown). The mobile device 201 may include a controller comprising at least one processor 240 (such as a microprocessor) which may control the overall operation of the device 201. The processor 240 may interact with one or more device subsystems such as a wireless communication subsystem 211 for exchanging RF signals with the wireless network 101 to perform communication functions. The processor 240 may interact with one or more additional device subsystems including a display 204 such as a liquid crystal display (LCD); one or more input devices 206 such as a touch-sensitive device (e.g., a touch-sensitive display or touch-sensitive overlay), a keyboard and/or control buttons; one or more memories such as a flash memory 244, a random access memory (RAM) 246 and/or a read only memory (ROM) 248; an auxiliary input/output (I/O) subsystem 250; a data port 252 such as serial data port (e.g., Universal Serial Bus (USB) data port); a speaker 256; a microphone 258; a short-range communication subsystem 262; and other device subsystems generally designated as 264.

In some examples, the input device 206 and the display 240 may be embodied in the same subsystem, such as a touch-sensitive display (also referred to as a touchscreen display). The input device 206 may include a touch-sensitive display, in addition to, or instead of, a keyboard. The touch-sensitive display may be constructed using a touch-sensitive input surface connected to an electronic controller and which may overlay the display 204. The touch-sensitive overlay and the electronic controller may provide a touch-sensitive input device and the processor 240 may interact with the touch-sensitive overlay via the electronic controller.

The communication subsystem 211 may include a receiver 214, a transmitter 216, and associated components, such as one or more antenna elements 218, 220, one or more local oscillators (LOs) 222, and a processing module such as a digital signal processor (DSP) 224. The antenna element(s) 218, 220 may be embedded or internal to the wireless device 201 and a single antenna may be shared by both receiver and transmitter. The particular design of the wireless communication subsystem 211 may depend on the wireless network 101 in which the wireless device 201 is intended to operate.

The wireless device 201 may communicate (e.g., via the antenna element(s) 218, 220) with the wireless network 101 in any suitable manner, such as with the transceiver base station 108 within its geographic coverage area, as described above. The wireless device 201 may send and receive communication signals over the wireless network 101, such as after the required network registration or activation procedures have been completed. Signals received by the antenna 218 through the wireless network 101 may be input to the receiver 214, which may perform suitable receiver functions such as signal amplification, frequency down conversion, filtering, and channel selection, among others, as well as analog-to-digital (A/D) conversion. A/D conversion of a received signal may allow more complex communication functions such as demodulation and decoding to be performed in the DSP 224. In a similar manner, signals to be transmitted may be processed, including modulation and encoding, for example, by the DSP 224. These DSP-processed signals may be input to the transmitter 216 for digital-to-analog (D/A) conversion, frequency up conversion, filtering, amplification, and transmission to the wireless network 101 via the antenna 220. The DSP 224 may not only process communication signals, but may also provide for receiver and transmitter control. For example, the gains applied to communication signals in the receiver 214 and the transmitter 216 may be adaptively controlled through automatic gain control algorithms implemented in the DSP 224.

The processor 240 may operate under stored program control and may execute instructions 221 (which may be referred to as software or modules) stored in memory such as persistent memory, for example, in the flash memory 244. As illustrated in FIG. 2, such instructions 221 may implement an operating system 223 and software applications 225. The software applications 225 may include a messaging client 272, which may be part of a personal information manager (PIM). Persistent data 274, including user data, may also be stored in the flash memory 244.

The instructions 221 or parts thereof may be temporarily loaded into volatile memory such as the RAM 246. The RAM 246 may be used for storing runtime data variables and other types of data or information. Although specific functions are described for various types of memory, this is provided for example only, and a different assignment of functions to types of memory may be used.

In some example embodiments, the wireless device 201 may include a removable memory card 230 (e.g., comprising flash memory) and a memory card interface 232. Network access may be associated with a subscriber or user of the wireless device 201 via the memory card 230, which may be a Subscriber Identity Module (SIM) card for use in a GSM network or other type of memory card for use in the relevant wireless network type. The memory card 230 may be inserted in or connected to the memory card interface 232 of the wireless device 201 in order to operate in conjunction with the wireless network 101.

The wireless device 201 may include a battery 238 as a power source, which may comprise one or more rechargeable batteries that may be charged, for example, through charging circuitry coupled to a battery interface such as the serial data port 252. The battery 238 may provide electrical power to at least some of the electrical circuitry in the wireless device 201, and the battery interface 236 may provide a mechanical and electrical connection for the battery 238. The battery interface 236 may be coupled to a regulator (not shown) which may provide power V+ to the circuitry of the wireless device 201.

The short-range communication subsystem 262 may be an optional component of the wireless device 201, which may provide for communication between the wireless device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

The wireless device 201 may provide at least two modes of communication: a data communication mode and a voice communication mode. In the data communication mode, a received data signal such as a text message, a message, or web page download may be processed by the communication subsystem 211 and input to the processor 240 for further processing. For example, a downloaded web page may be further processed by a browser application or a message may be processed by the messaging client 272 and output to the display 204. A user of the wireless device 201 may also compose data items, such as messages, for example, using the input device 206 in conjunction with the display 204. These composed items may be transmitted through the communication subsystem 211 over the wireless network 101.

In the voice communication mode, the wireless device 201 may provide telephony functions and may operate as a typical cellular phone. The overall operation may be similar, except that the received signals may be output to the speaker 256 and signals for transmission may be generated by a transducer such as the microphone 258. The telephony functions may be provided by a combination of software/firmware (e.g., a voice communication module) and hardware (e.g., the microphone 258, the speaker 256 and input device 206). Alternative voice or audio I/O subsystems, such as a voice message recording subsystem, may also be implemented on the wireless device 201. Although voice or audio signal output may be accomplished primarily through the speaker 256, the display 204 may also be used to provide output, such as an indication of the identity of a calling party, duration of a voice call, or other voice call related information.

The construction of a computer 117 may be generally similar to a wireless device 201 with differences relating primarily to size and form factor, as well as the capabilities of the electronic components (which are typically more powerful and larger than in a mobile device 201 due to fewer design constraints). A computer 117 may be non-portable (e.g., in the case of a desktop computer) and may have physical wired connections to external resources, such as a wall socket for power. A computer 117 may have greater memory, power and processing resources, compared to a wireless device 201. Input and/or output devices for a computer 117 may be larger than for a wireless device 201, which may result in user interfaces designed for use on a computer 117 being different from those designed for use on a wireless device 201. In some examples, software and user interfaces designed for use on a computer 117 may be inappropriate or unsuitable for use on a wireless device 201, and vice versa. The computer 117 may be enabled for wired or wireless communications, as described above. The construction of computers 117 is not the focus of the present disclosure and will not be described further herein.

The term "electronic device" may be used to refer to either a wireless device 201 or a computer 117, unless stated otherwise.

The wireless device 201 may execute computer executable programmed instructions for directing the wireless device 201 to implement various applications and carry out various functions. The programmed instructions may be embodied in the instructions 221 resident in the memory (e.g., flash memory 244) of the wireless device 201. The programmed instructions may also be tangibly embodied on a computer readable medium (such as a DVD, CD, external hard drive, floppy disk or other storage media) which may be used for transporting the programmed instructions to the wireless device 201. Alternatively, the programmed instructions may be embedded in a computer-readable, signal-bearing medium that may be uploaded to the wireless network 101, such as by a vendor or supplier of the programmed instructions, and this signal-bearing medium may be downloaded to the wireless device 201 from, for example, the wireless network 101 by end users.

A user may interact with the wireless device 201 using a graphical user interface (GUI) that may be displayed on the display 204. The GUI may provide a display format enabling the user to choose commands, execute application programs, manage computer files, and perform other functions by selecting pictorial representations (e.g., icons), or selecting items from a menu through the use of the input device 206. The GUI may be used to convey information and/or receive commands from the user and may include a variety of objects and/or controls, such as icons, toolbars, drop-down menus, pop-up menus, text, dialog boxes, and buttons, among others. A user may interact with the GUI presented on the display 204 using the input device 206 to position a pointer or cursor over an object (also referred to as "pointing" at the object) and by selecting the object (also referred to as "clicking" or "highlighting" the object) using the input device 206. This may be referred to as a point-and-click or selection operation.

In some examples, the instructions 221 on the device 201 may include definition of logical perimeters, which may be used to logically separate information (including, for example, data, applications and/or resources) on the device. Perimeters may be used to define sets of information to which different device management policies (e.g., privacy or security policies) may apply. Information that is part of one perimeter may be inaccessible or have limited access by information of another perimeter, unless specifically denoted as being shared information.

In some instances, particular resources may be shared among multiple perimeters. For example, a network resource belonging to a first perimeter may be accessible to application(s) belonging to other perimeters. The instructions 221 may include policies for cross-perimeter access that specify rules for individual perimeters, applications, network resources, or any suitable combination.

An administrator of a perimeter may determine which resources of the perimeter can be accessed by other perimeters. For example, a personal perimeter can be managed by the user of the device 201, and a corporate (or enterprise) perimeter can be managed by a corporate administrator (e.g., an IT administrator of the company). Personal applications belonging to the personal perimeter can use network resources belonging to the personal perimeter. The user may have the ability to set whether the personal applications can use a corporate resource, such as a corporate network. For example, due to privacy concerns, a user may not want his or her web browsing information to traverse a corporate network.

In some examples, a corporate administrator may have the ability to set rules on what perimeters (at a macro level) or what applications (at a micro level) can use corporate resources, such as the corporate networks. For example, due to security concerns, a corporate administrator may not want a user-installed application (which may be malware or otherwise) to be able to access corporate network resources. But the administrator may trust certain applications (e.g., applications provided by a particular software provider, or applications having certain security features) and allow those applications to access the corporate network.

Implementation of perimeters may enable a single device 201 to be concurrently used for both personal and work purposes, while keeping personal and work traffic separate. Such use can be provided in a convenient manner that requires little or no user intervention after the initial setup. For example, a user may use the device 201 to access the Internet through non-corporate networks for personal use without being subject to restrictions imposed by their employer, and without having their traffic subject to being monitored or scrutinized by their employer. The user may also use the same device 201 to access the Internet or other network resources through corporate networks for work purposes. The device 201 may be configured to allow corporate control over the work traffic, and the user may be given control over whether personal traffic is allowed to flow on corporate networks.

A service relationship may need to be established between a wireless device 201 and a mobile data server, such as the MDM server 138. The process of establishing a service relationship between the wireless device 201 and a server (such as the MDM server 138) may be referred to as "activating" the device 201 on the server. For ease of reference, the present disclosure describes activating the device 201 on the MDM server 138 (also referred to as server 138). However, it should be understood that the present disclosure may also be applicable for activating the device 201 on other suitable servers, for example any data server on which a device 201 may need to be activated in order to receive data and/or services from that data server.

In simple terms, activation may provide the server 138 with the information it needs to know about the wireless device 201 to provide various wireless services to the device 201, and may provide the wireless device 201 with the information it needs to know about the server 138 to receive those wireless services. The device 201 may store service data, which may comprise information required by the device 201 to establish and maintain communications with, for example, the wireless network 101 (e.g., wireless network service data) and the wireless gateway 110 (e.g., gateway service data).

The service data stored on the wireless device 201 may include services books. A service book or service record may be a record that may provide routing information about a service endpoint of the server 138. For secure transmission, encryption keys may be provided as part of the service book, or the encryption keys may be provided separately but associated with the respective service book. The service book may perform various functions including describing how to contact a service and describing how to contact it securely. The service book may also provide information about the service's features, capabilities and configuration. After activation, the wireless device 201 may have the service books that the server 138 has provided to it. However, it is possible that the wireless device 201 may not make, use or even support the services provided to it. For example, to conserve memory on the wireless device 201, the server 138 may withhold service books for services which the server 138 anticipates that the wireless device 201 may not be able to support.

Service books may be associated with a particular "content type" which may identify the application level protocol used for a particular service. A server 138 may provide several services to the wireless device 201. For example, a server 138 may advertise several services, such as email (CMIME), wireless calendar synchronization (CICAL), and PIM data synchronization (SYNC) among other wireless services. Other services may include an Internet Protocol (IP) Proxy for providing Internet access on the wireless device 201 and a Global Address Lookup (GAL) for accessing an enterprise address book on an enterprise wireless device 201, for example.

The activation process may involve exchanging identifying information between the wireless device 201 and the server 138. The identifying information about the wireless device 201 may be the device PIN and the identifying information about the server 138 may be a service unique identifier (UID). Other identifying information about the wireless device 201 (e.g. a different device identifier) and the server 138 (e.g. a different server identifier) may be used. The device PIN may be a unique number assigned to each wireless device 201, typically expressed as a 32 bit number. The server 138 may address data to a given wireless device 201 using the corresponding device PIN.

The service UID may be an identity string assigned to each server 138 that connects to a wireless network relay infrastructure (not shown) of the wireless network 101 which receives and routes wireless data packets to and from the wireless devices 201. The service UID may be of the form "Sn" where the n represents a decimal number. The service UID may be referred to as the Server Routing Protocol (SRP) Identifier. Each service UID may be accompanied with an SRP authentication key which may be required to authenticate the SRP connection of a server 138 to a relay server (not shown) of the wireless network relay infrastructure.

To activate the wireless services for a new user on a wireless device 201 not currently operating with the server 138, an IT administrator may create a user account for the new user in the user records of the respective server 138, for example using an administration tool. This may comprise creating a user account in a configuration database maintained by the server 138, and associating a user mailbox in a mailbox database with the user account created in the configuration database. Where the user account data is stored may depend on the messaging server 132 which is used, for example, whether a Microsoft Exchange™, IBM Lotus Domino™, or Novell GroupWise™ messaging server is used.

Each user account may contain a user account profile which may specify, among other things, the service(s) that the user of the device 201 is to have access to. The service(s) available for a user may be set by the IT administrator and may change over time, for example as services are added and/or removed. User account information may not be stored on a per-user basis. For example, rather than a per-user basis, some user information (such as IT policy data) may be assigned to a user, a number of users or a user group. IT policy attributes can be assigned to a variety of "containers", for example, some policies might be assigned to a group or group(s) of which a user is a member. A user may belong to one or more such groups. IT policy data for a given user may then be dynamically computed based on the user's current group membership(s). Thus, some of the user profile data items may be computed and/or collated from other locations in the configuration database, rather than being stored explicitly on a per-user basis (e.g. within the user account profile).

The addition of a user account may provide information instructing the server 138 that it is to provide wireless services to the user via the user account; however, the server 138 may require further information identifying which wireless device 201 is associated with the user account. Such further information may be provided by activation of the wireless device 201 with the server 138. Prior to activation of the wireless device 201 with the server 138, the mobile data server 138 may not be able to provide services to the wireless device 201, even though such services have been enabled for the user of the wireless device 201.

The wireless device 201 may be activated through a physical or logical cable connection (e.g., a serial or USB connection) to a computer 117 which may be securely connected to the mobile data server 138. This process may be referred to as "wireline activation". In some examples, the information which may be transferred between the wireless device 201 and the server 138 through the wireline connection may be assumed to be trustworthy and secure for activation purposes. Accordingly, no activation password may be required for a wireline activation operation in some examples. In other examples, whether in enterprise or public implementations, an activation password and/or other security mechanisms may be implemented to provide an additional layer of security. In some examples, a Bluetooth® or other personal area network (PAN) connection to the computer 117 may be used for exchanging activation information rather than a wireline connection.

Activation may also occur wirelessly. For wireless activation, it may be important to authenticate the wireless device 201 being activated on the server 138, in order to avoid unauthorized access to wireless services. It may not be sufficient to rely on a caller identification (ID) or email address of a wireless device 201 for authentication purposes, since a caller ID or email address may be spoofed.

Conventional methods for wirelessly activating a wireless device 201 with a server 138 may be cumbersome for system administrators and end users. Typically, an administrator is required to generate an activation password for a new user account and must provide the activation password to the user in a secure manner (e.g., verbally or by secure mail). The user is then typically required to initiate communication with the server 138 using the user's wireless device 201 by providing a username, the activation password and an identifier for the server 138 (e.g., a Server Routing Protocol Identifier (SRP ID)). The user may be required to navigate through multiple menus on the device 201 (e.g., in subfolder "Settings→Accounts→Accounts→Advanced→Work Account") in order to enter in the necessary credentials. As well, the activation password and the SRP ID are typically long and difficult to remember, write down and manually enter, particularly if the user is travelling.

In various examples and embodiments, the present disclosure may provide a more user-friendly method for activating a wireless device 201 for operation on a server 138.

Figure 3:
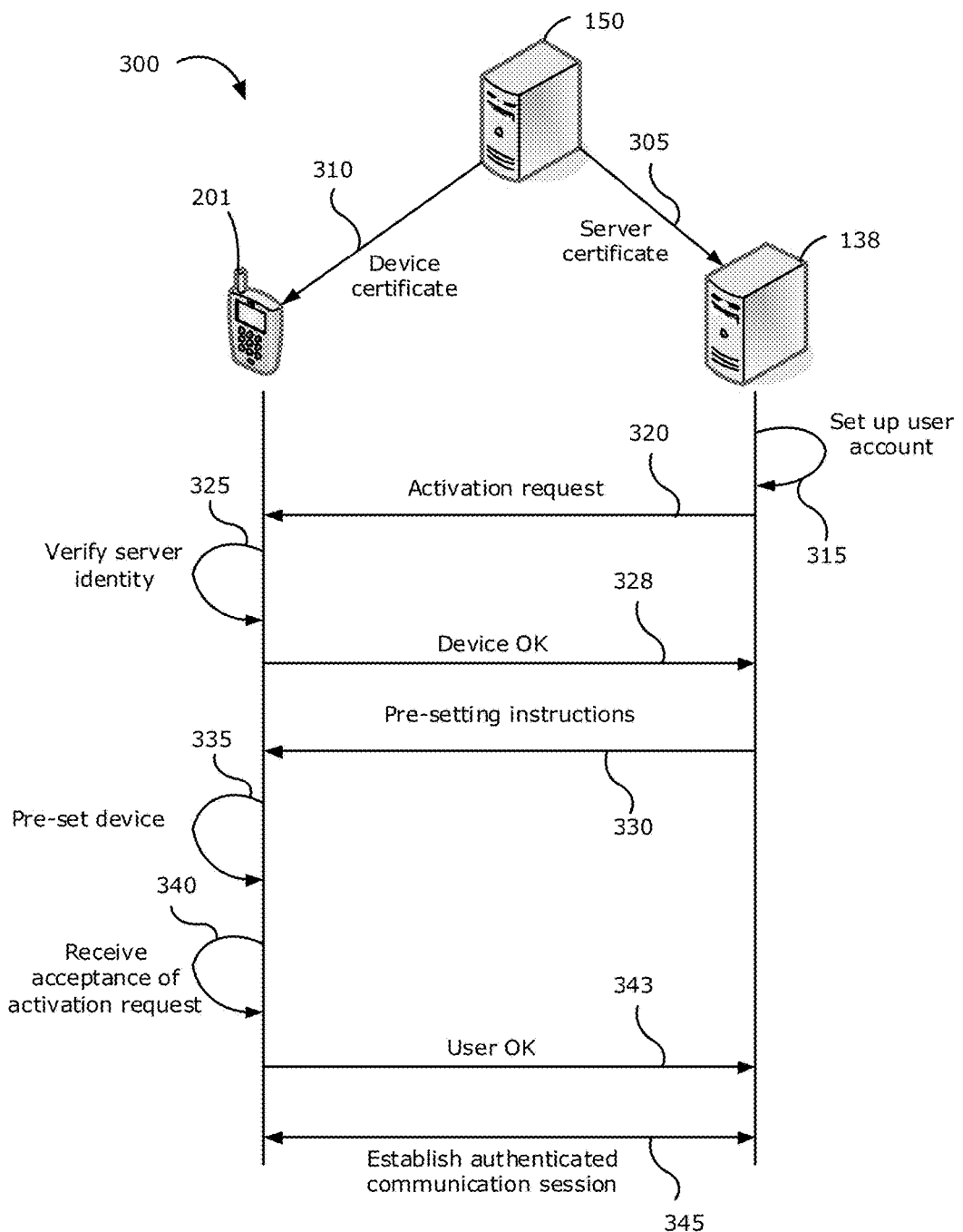
FIG. 3 is a signalling diagram illustrating a method of activating a wireless device for operation with a server in accordance with an example embodiment of the present disclosure.

FIG. 3 is a signal diagram illustrating example operations 300 for activating the wireless device 201 for operation on the server 138. In this example, activation of the wireless device 201 may be initiated by the server 138, without any prior request for activation being transmitted from the wireless device 201. This may also be referred to as the server 138 "pushing" the activation to the device 201. In this example, rather than using passwords or other credentials that may be manually provided by the user, the wireless device 201 may be authenticated to the server 138 through the use of a device certificate, as described below.

At 305, the certificate authority 150 may issue a server certificate to the server 138. The server certificate may include server identity information as well as server authentication information. Where the server certificate includes both server identity information and server authentication information, the server certificate may be a dual-purpose certificate, which may be used both for signing purposes (e.g., for signing a request sent from the server 138) as well as for authentication purposes (e.g., for establishing an authenticated transport layer security (TLS) session). In other examples, separate certificates may be required for signing and authentication, in which case one or both of a server signing certificate and a server authentication certificate may be issued by the certificate authority 150 to the server 138. The server certificate may provide further information about the server 138, such as the name of the company associated with the server 138, the location of the company and/or a company logo. Typically, at least the name and location of the company may be provided. Although 305 is shown as part of the process 300, issuing a server certificate by the certificate authority 150 may take place prior to the process 300. For example, a server certificate may be issued to the server 138 when the server 138 is first registered on the network 101.

At 310, the certificate authority 150 may issue a device certificate to the device 201. This may take place when the device 201 boots up and connects to the communication system 100 for the first time (e.g., first initiation of the device 201 after manufacture, or after refurbishment). The device certificate may include device identity information (e.g., the device PIN) as well as device authentication information.

The certificate authority 150 may be a trusted third-party having capabilities to verify the identity of the device 201. For example, each device 201 may be associated with a device PIN and associated security key. Such information may be programmed into the device 201 during manufacture, for example, and may be relatively secure against tampering (e.g., the PIN and the security key may be hardcoded into the device 201 and may be unchangeable except through the use of specialized software by authorized personnel). The device PIN may be a reliable identification of the device 201, in particular when verified with the associated security key (which may be even more secure and reliable than the PIN). The certificate authority 150 may have a database of device PINs and security keys associated with each PIN (e.g., the certificate authority 150 may be managed by the manufacturer of the device 201). When the device 201 connects with the network 101 for the first time, the device 201 may automatically request a device certificate from the certificate authority 150, by providing the certificate authority 150 with the PIN and security key of the device 201 for verification, for example. Alternatively, the certificate authority 150 may detect a first-time connection by the device 201 and may query the device 201 for its PIN and security key, for example, before providing the device 201 with a device certificate.

Thus, the device certificate may be relied upon by other network entities (e.g., the server 138) to verify the identity of the device 201, since the device certificate was issued by a trusted certificate authority 150. Similarly, the server certificate issued by the certificate authority 150 in 305 above may be relied upon by other network entities (e.g., the device 201) to verify the identity of the server 138.

At 315, a user account associated with the device 201 may be set up on the server 138. An example of such a set up process is discussed above, although other set up methods may be possible. The set up process may include associating the user account (including a user's email address) with the device PIN of the device 201 belonging to the user. Although described after 310, in some examples 315 may occur prior to 310 or even prior to 305.

At 320, the server 138 initiates (or "pushes") an activation request to the device 201. The activation request may be a request from the server 138 to activate the device 201 on the server 138 itself. This may be in contrast to conventional approaches where the device 201 initiates a request to activate the device 201 itself on the server 138. The activation request from the server 138 may be signed using the server certificate. The activation request may include information about the user account, the server 138 and/or services to be provided. For example, the activation request may include information on the PIN of the device 201, an activation URL and the user's email account.

At 325, after receiving the activation request from the server 138, the device 201 may verify the request signature and the server certificate, in order to verify the identity of the server 138 requesting activation. The device 201 may verify (e.g., using server identification information included in the server certificate) that the server 138 requesting activation is a valid trusted server (e.g., a trusted enterprise or corporate server), from which an activation request may be expected. This verification may be carried out using any suitable method. If the server 138 cannot be verified (e.g., the device 201 determines that the server certificate is not from a trusted source or the server identity is not an expected identity), the activation request may be rejected and the process 300 may end. Rejection of the activation request may also be communicated to the server 138 (e.g., an "activation failed" message may be sent to the server 138).

If the device 201 verifies the server identity, the activation request may be accepted by the device 201. Acceptance by the device 201 may be communicated to the server 138, such as by the device 201 transmitting a "device OK" message to the server 138 at 328. At this stage, the device 201 may be considered to be "partially activated", in that the device 201 has verified that the activation request is from a trusted server 138, however activation has not yet been accepted by the user (and the user may not yet be aware that activation of the device 201 is in process).

At 330, after sending the activation request but prior to a reply to the request from the device 201, the server 138 may further send instructions to the device 201 for pre-setting the device 201. Although described after 328, in some examples 330 may take place earlier.

Pre-setting instructions may include instructions to cause the device 201 to pre-set one or more perimeters on the device 201, pre-install one or more applications on the device 201 (e.g., the device 201 may be able to access a corporate website to download and install application(s) and/or may be able to accept application(s) pushed by the server 138), pre-setting one or more device configurations and/or pre-setting one or more personal information management (PIM) settings (which may including synchronizing PIM information, such as carrying over previous PIM information). Pre-setting instructions may be customized by the IT administrator of the server 138 in order to suit particular corporate and/or user preferences and/or requirements. For example, certain work and personal perimeters may be specified to be pre-set according to corporate policy, or certain software applications may be specified to be pre-installed according to the user's job function.

At 335, the device 201 may carry out the instructions received at 330 to pre-set the device 201. Prior to the user accepting the activation request, the device 201 may be considered only partially activated. In this state, the pre-settings on the device 201 may not be operational and/or accessible by the user. For example, anything pre-set on the device 201 may remain non-operational and/or partitioned such that such pre-settings are inaccessible to the user. Thus, at this stage the user may not yet experience any difference in the user experience on the device 201 and may not be aware that activation of the device 201 is in process.

At 340, the device 201 may receive input indicating acceptance of the activation request. Such input may be provided by the user via the input device 206, in response to a prompt (e.g., a button or a dialog box) presented to the user via the display 204. The prompt may include, for example, display of an activation icon. Selection of the icon may cause the display of a dialog asking if the user would like to activate the device 201 against the server 138. Information about the server 138 and/or the user's user account on the server 138 may be provided, such as the email address of the user account and/or information about the server 138 (e.g., the company associated with the server 138, the company's location and/or a company logo), which information may be extracted from the server certificate.

If the device 201 receives input rejecting the activation request (e.g., the user selects a cancel icon), the process 300 may end. Rejection of the activation request may also be communicated to the server 138 (e.g., an "activation failed" message may be sent to the server 138). Any pre-setting(s) made on the device 201 may be removed by the device 201. The user may thus be unaware that any such pre-setting was ever made on the device 201.

If input indicating acceptance of the activation request is received at the device 201, this acceptance may be communicated to the server 138, for example by transmission of a "user OK" message at 343.

Acceptance of the activation request may also result in full operation of any pre-setting(s) made on the device 201. For example, any pre-set perimeter(s), pre-installed application(s), pre-set device configuration(s) and/or pre-set PIM information may become fully operational and/or accessible to the user. Any pre-setting(s) that are not yet complete (e.g., installation of an application still in progress) may become fully operational once complete.

At 345, after receiving a positive response to the activation request, the device 201 may establish an authenticated communication session with the server 138, such as a mutually authenticated communication session. An example of a mutually authenticated communication session may be a TLS session or a secure sockets layer (SSL) session. The device certificate (or device authentication certificate) and the server certificate (or server authentication certificate) may be used to establish the authenticated communication session. For example, the server 138 may extract the device identity information (e.g., device PIN) from the device certificate and compare this information with that set up in the user account, in order to verify the identity of the device 201.

Activation of the device 201 on the server 138 may then take place over the authenticated communication session using any suitable method (e.g., using exchange of activation tokens). Appropriate information may be displayed via the display 204, to provide the user with information during the activation process. For example, information (e.g., an image or logo from a security standard such as X.509) may be displayed to the user to indicate that the device 201 is being securely activated on the correct server 138.

Once activation is complete, the device 201 may transition from the partially activated state to the fully activated state.

Thus, from the perspective of a user, activation may appear to be a simple, single-action process (e.g., only a single selection of an activation icon may be required from the user), and may not require manual entry of any passwords, server ID or usernames, for example. Further, the potentially lengthy process of pre-setting the device 201 (which may take about 10 to about 15 minutes, typically) may take place in the background without the user's knowledge, with the result that installation and full operation of the pre-set information (e.g., at 340 above) may appear to the user to be very fast.

Activation may be carried out using any suitable process. Some details of activation are described here, however other details may be generally understood without detailed discussion here.

Activation of the device 201 on the server 138 may include the server 138 discovering the capabilities of the device 201. For example, the server 138 may read device capability data from the device 201. The device capability data may include one or more of:

information regarding whether the device 201 supports Secure/Multipurpose Internet Mail Extensions (S/MIME);

information regarding whether the device 201 supports wireless folder management;

information regarding whether the device 201 supports wireless calendar;

any cryptographic algorithms supported by the device 201 for device/server communications;

any character set encoding supported by the device 201 (e.g., UTF-8, UTF-16 or 150-8859-1) for the "traditional" service types (e.g., CMIME, CICAL, ALP or SYNC);

information regarding whether the device 201 supports wireless application delivery;

information regarding whether the device 201 supports application control policies;

information regarding whether the device 201 can be reached via a wireless network relay infrastructure;

the service book level supported by device 201;

the maximum upload message size supported by device 201;

the maximum download message size supported by device 201;

the application version of the device 201;

the model of the device 201;

the hardware identifier of the device 201;

the operating system version of the device 201;

the branding identifier of the device 201;

the network type of the device 201;

information regarding whether the device 201 supports "rich content" (e.g. HTML email);

information regarding whether the device 201 supports context-based compression;

any services types for which device 201 supports multiple instances;

information regarding whether the device 201 supports synchronization of personal distribution lists;

information regarding whether the device 201 supports "flags for follow-up"; and information regarding whether the device 201 supports server-provided browser configuration data.

After the wireless device 201 has been successfully activated, sufficient information has been exchanged for regular wireless service to be established between the server 138 and the wireless device 201. For example, after activation is completed one or more of the following data may have been exchanged:

the device PIN associated with the user account may be stored on the server 138. The device PIN may be used by the server 138 in order to address data to the wireless device 201;

the service UID associated with the server 138 may be stored on the device 201. The service UID may serve as a server-side routing destination to which the wireless device 201 may route data. The wireless device 201 may address data that is to be sent to a particular server by specifying the corresponding service UID;

the wireless device 201 may have stored information indicating what services the server 138 can provide. This maybe communicated from the server 138 through information in the service books;

IT policy information defined by the IT administrator may be stored on the wireless device 201. This information may be encoded in IT policy data (e.g. IT policy data messages);

the server 138 may have stored information about the capabilities of the wireless device 201; and a shared private encryption key generated by the server 138 may be stored on both the server 138 and the device 201, to enable encrypted communication between the server 138 and the device 201. The private encryption key may be included with the service book data.

In some examples, activation of the device 201 on the server 138 may be required again after any of the information exchanged during activation is changed. Activation of the device 201 on the server 138 may also be required if the device 201 is wiped or refurbished, for example. This process may be referred to also as activation or reactivation. Some information previously exchanged and established in the initial activation may be maintained, such that reactivation may differ from initial activation. For example, if the server-side information changes, the shared encryption context between the device 201 and the server 138 may be maintained such that mutual authentication may not be required for wireless reactivation. Reactivation may include overwriting any information maintained from a previous activation. For example, reactivation may be required in one or more of the following situations:

the user of the device 201 seeks to use a different server, in which case the wireless device 201 may require new service routing data (e.g., the service UID) of the new server. This may be effectively a new activation on the new server;

the server 138 is updated to have new or different service(s) and/or capability(ies) about which the device 201 may require service data;

the user of the device 201 switches to a different device 201, in which case the server 138 may require information about the different device 201 (e.g., the device PIN and capabilities of the different device 201), and information such as the IT policy data and private encryption key may need to be established on the different wireless device 201.

This may be effectively a new activation of the different wireless device 201 on the existing server 138; or when device software is updated or the device software is erased (e.g., as a result of a data security action, such as a device wipe), in which case the wireless device 201 may obtain have new or different function(s) and/or capability(ies) about which the server 138 may require information. A device software update or device wipe may also purge the private encryption key and so the private encryption key may need to be re-established on the device 201. In some examples, IT policy data may be maintained over a software update. If the private encryption key and service data is preserved and the device capabilities do not change, a device software update/load may not require reactivation.

Figure 4:
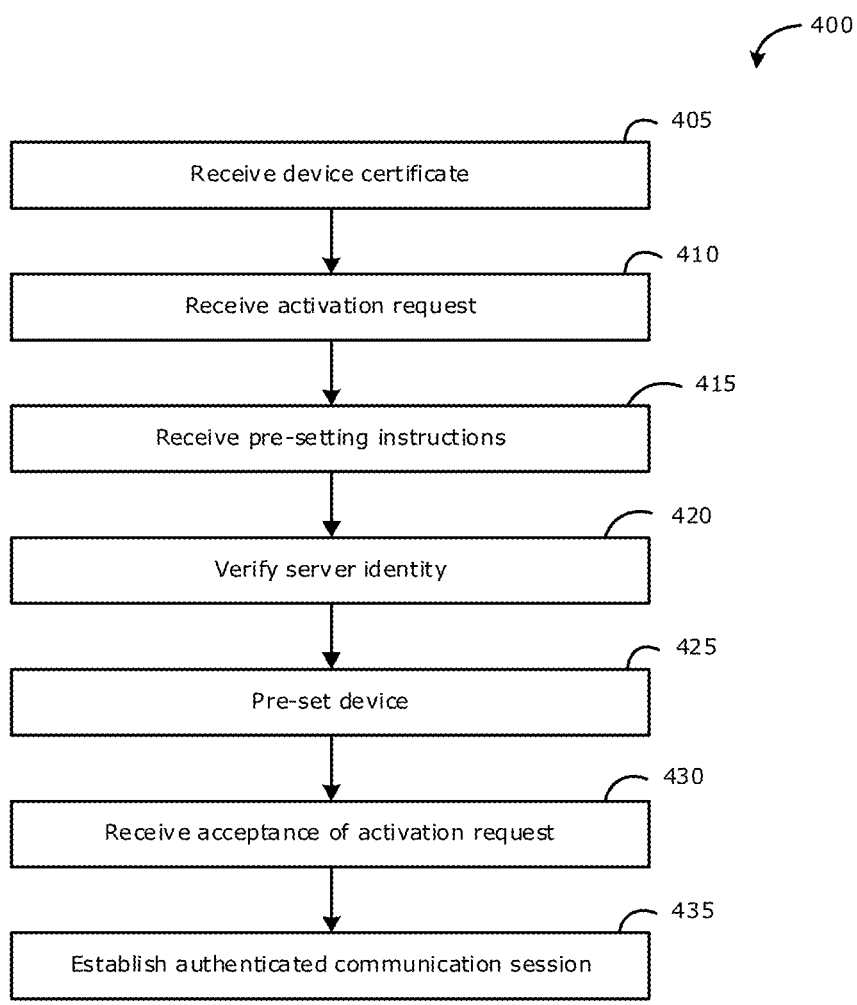
FIG. 4 is a flowchart illustrating a method of activating a wireless device for operation with a server, from the viewpoint of the device, in accordance with an example embodiment of the present disclosure.

FIG. 4 is a flowchart illustrating an example method 400 for activation of the device 201 for operation on the server 138, from the viewpoint of the device 201.

At 405, the device 201 may receive the device certificate. The device certificate may be received from the certificate authority 150, for example when the device 201 connects to the communication network 101 for the first time.

At 410, the device 201 may receive an activation request pushed to the device 201 by the server 138. The activation request may include a server certificate that may include at least server identity information and the activation request may be signed using the server certificate. As described above, the activation request may include information about the server 138, such as the name of the company associated with the server 138, the company's location and/or a company logo.

At 415, pre-setting instructions may be received from the server 138. Such instructions may instruct the device 201 to make pre-setting(s) on the device 201, prior to the user's acceptance of activation on the server 138, for example as described above.

At 420, the device 201 may verify the server certificate, for example to verify the identity of the server 138 requesting activation. Although described after 415, in some examples 420 may take place prior to 415. If verification of the server certificate fails, the device 201 may reject the activation request and the method 400 may end. Any pre-setting(s) made may be removed by the device 201 if server certificate verification fails.

At 425, after the server identity has been verified by the device 201, the device 201 may carry out the pre-setting instructions. These instructions may be carried out to pre-set the device 201, without the user's knowledge or explicit approval. As described above, any pre-setting(s) made on the device 201 may remain non-operational and/or inaccessible to the user until the activation request is accepted by the user.

At 430, the device 201 may receive input indicating acceptance of the activation request (e.g., selection of an activation icon by the user). Any pre-setting(s) on the device 201 may become active at this time (or later, upon completion of the pre-setting process). If input indicating rejection of the activation request is received (e.g., selection of a cancel icon by the user), the method 400 may end. Any pre-setting(s) made on the device 201 may be removed from the device 201, without knowledge of the user.

At 435, the device 201 may establish an authenticated communication session with the server 138, such as a mutually authenticated communication session, over which activation of the device 201 may take place. This may involve the device 201 exchanging authentication certificates with the server 138, such as for establishing a TLS or SSL session. The device 201 may provide its device certificate to the server 138, in order to verify its own identity (e.g., through device PIN information included in the device certificate), as part of establishing the authenticated communication session.

Activation of the device 201 on the server 138 may then take place according to suitable methods and processes (e.g., including exchange of activation tokens as appropriate).

Figure 5:
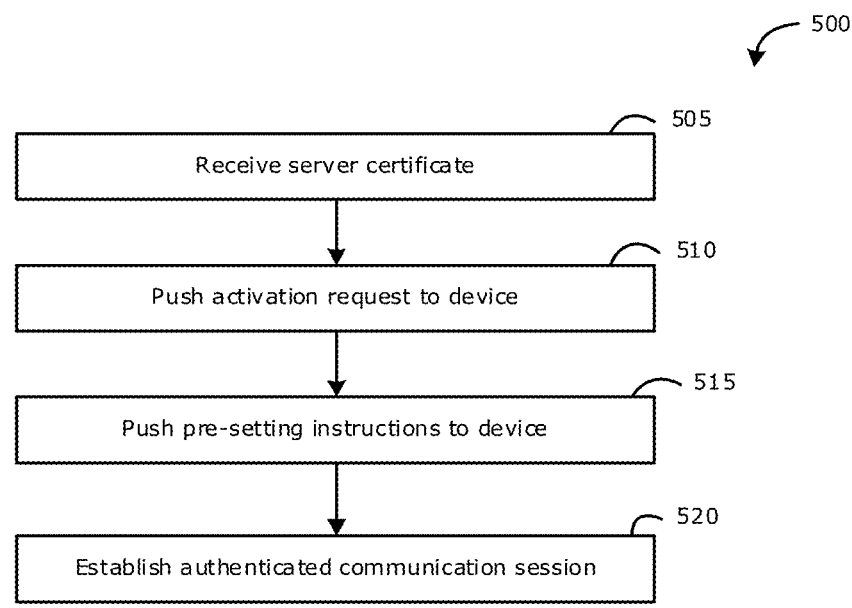
FIG. 5 is a flowchart illustrating a method of activating a wireless device for operation with a server, from the viewpoint of the server, in accordance with an example embodiment of the present disclosure.

FIG. 5 is a flowchart illustrating an example method 500 for activation of a device 201 on a server 138, from the viewpoint of the server 138.

At 505, the server 138 may receive a server certificate, for example from a certificate authority 150. The server certificate may be a single dual-purpose certificate (e.g., where the single server certificate may serve as both a signing certificate and an authentication certificate), or else separate server signing certificate and server authentication certificate may be provided to the server 138. 505 may take place prior to any of the methods and processes discussed herein. For example, the server 138 may obtain a server certificate when the server 138 is first registered in the network 101.

At 510, the server 138 may push an activation request to the device 201. This may be after a user account for the user of the device 201 has been set up (e.g., by an IT administrator) on the server 138. The activation request may be pushed to the device 201 based on information set up in the user account. The activation request may be signed using the server certificate (or server signing certificate).

At 515, the server 138 may push pre-setting instructions to the device 201. In some examples, 515 may take place only after the server 138 receives indication from the device 201 that the server certificate and the request signature have been verified by the device 201.

At 520, the server 138 may establish an authenticated communication session with the device 201, such as a mutually authenticated communication session, in order to activate the device 201 on the server 138. Establishing the authenticated communication session may be only after approval from the device 201 (e.g., after the server 138 receives indication from the device 201 that the activation request has been accepted by the user), and may involve exchange of certificates between the device 201 and the server 138, for example for establishing a TLS or SSL session. The server 138 may verify the identity of the device 201 (e.g., by comparing the device PIN included in the device certificate against the device PIN associated with the user account set up in the server 138), as part of establishing the authenticated communication session.

Activation of the device 201 on the server 138 may then take place according to suitable methods.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar non-transient computer readable medium including program instructions stored thereon for performing the methods described herein, including DVDs, CDs, volatile or non-volatile memories, or other storage media, for example.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology. All references mentioned are hereby incorporated by reference in their entirety.

The invention claimed is:

1. A method for a wireless communication device, comprising:
 receiving, by the wireless communication device from a server for providing wireless services for wireless communication devices, an activation request to establish a wireless communication service relationship between the wireless communication device and the server, wherein the activation request is pushed from the server to the wireless communication device in absence of any prior communication being sent from the wireless communication device to the server;
 attempting, by the wireless communication device, to verify identity information of the server;
 after the identity information of the server is verified by the wireless communication device and input to accept the activation request is received by the device, establishing a mutually authenticated communication session between the wireless communication device and the server; and
 establishing, using the mutually authenticated communication, the wireless communication service relationship between the wireless communication device and the server.

2. The method of claim 1, wherein the activation request is authenticated with a signature signed with a server certificate, wherein the server certificate includes server identity information, wherein the wireless communication device attempts to verify one or both of the signature or the server identity information.

3. The method of claim 2, wherein the mutually authenticated communication session is authenticated by the wireless communication device using the server certificate and a device certificate on the wireless communication device.

4. The method of claim 3, wherein the server certificate also includes server authentication information, and wherein the device certificate includes device identity information and device authentication information.

5. The method of claim 4, wherein the server is a mobile device management server distinct from a certificate authority which issued the server certificate and device certificate.

6. The method of claim 1, further comprising:
 after the server is verified by the wireless communication device and before input to accept the activation request, receiving pre-setting instructions from the server, and pre-setting the wireless communication device with pre-settings in accordance with the pre-setting instructions from the server, wherein the pre-settings made on the wireless communication device are initially inactive;
 activating the pre-settings after the input to accept the activation request is received by the wireless communication device.

7. The method of claim 6, further comprising:
 removing the pre-settings after the input to reject the activation request is received by the wireless communication device.

8. The method of claim 6, wherein pre-settings comprises one or more of pre-setting a security perimeter governing usage of one or more resources on the wireless communication device, pre-installing an application on the wireless communication device or pre-setting personal information management (PIM) on the wireless communication device.

9. A wireless communication device, comprising:
 a processor;
 a memory coupled to the processor, the memory storing executable instructions that, when executed by the processor, cause the wireless communication device to:
  receive, from a server for providing wireless services for wireless communication devices, an activation request to establish a wireless communication service relationship between the wireless communication device and the server, wherein the activation request is pushed from the server to the wireless communication device in absence of any prior communication being sent from the wireless communication device to the server;
  attempt to verify identity information of the server;
  after the identity information of the server is verified by the wireless communication device and input to accept the activation request is received, establish a mutually authenticated communication session between the wireless communication device and the server; and
  establish, using the mutually authenticated communication, the wireless communication service relationship between the wireless communication device and the server.

10. A non-transitory machine readable medium having tangibly stored thereon executable instructions for execution by a processor of a wireless communication device that, when executed by the processor, cause the wireless communication device to:
 receive, from a server for providing wireless services for wireless communication devices, an activation request to establish a wireless communication service relationship between the wireless communication device and the server, wherein the activation request is pushed from the server to the wireless communication device in absence of any prior communication being sent from the wireless communication device to the server;
 attempt to verify identity information of the server;
 after the identity information of the server is verified by the wireless communication device and input to accept the activation request is received, establish a mutually authenticated communication session between the wireless communication device and the server; and
 establish, using the mutually authenticated communication, the wireless communication service relationship between the wireless communication device and the server.

11. A method for a server for providing wireless services for wireless communication devices, comprising:
- pushing to a wireless communication device an activation request to establish a wireless communication service relationship between the wireless communication device and the server, wherein the activation request is pushed from the server to the wireless communication device in absence of any prior communication being sent from the wireless communication device to the server;
- after notification that the activation request has been accepted establishing a mutually authenticated communication session between the wireless communication device and the server; and
- establishing, using the mutually authenticated communication, the wireless communication service relationship between the wireless communication device and the server.

12. The method of claim 11, wherein the activation request is authenticated with a signature signed with a server certificate, wherein the server certificate includes server identity information, wherein the wireless communication device attempts to verify one or both of the signature or the server identity information.

13. The method of claim 12, wherein the mutually authenticated communication session is authenticated by the wireless communication device using the server certificate and a device certificate on the wireless communication device.

14. The method of claim 12, wherein the server certificate also includes server authentication information, and wherein the device certificate includes device identity information and device authentication information.

15. The method of claim 14, wherein the server is a mobile device management server distinct from a certificate authority which issued the server certificate and device certificate.

16. The method of claim 1, further comprising:
- before notification that the activation request has been accepted is received, pushing pre-setting instructions to the wireless communication device, wherein the pre-setting instructions cause pre-setting the wireless communication device with pre-settings in accordance with the pre-setting instructions from the server, wherein the pre-settings made on the wireless communication device are initially inactive until the activation request is accepted.

17. The method of claim 16, wherein the pre-setting instructions cause removal of the pre-settings after the input to reject the activation request is received by the wireless communication device.

18. The method of claim 16, wherein pre-settings comprises one or more of pre-setting a security perimeter governing usage of one or more resources on the wireless communication device, pre-installing an application on the wireless communication device or pre-setting personal information management (PIM) on the wireless communication device.

19. A server for providing wireless services for wireless communication devices, comprising:
- a processor;
- a memory coupled to the processor, the memory storing executable instructions that, when executed by the processor, cause the server to:
  - push to a wireless communication device an activation request to establish a wireless communication service relationship between the wireless communication device and the server, wherein the activation request is pushed from the server to the wireless communication device in absence of any prior communication being sent from the wireless communication device to the server;
  - after notification that the activation request has been accepted, establish a mutually authenticated communication session between the wireless communication device and the server; and
  - establish, using the mutually authenticated communication, the wireless communication service relationship between the wireless communication device and the server.

20. A non-transitory machine readable medium having tangibly stored thereon executable instructions for execution by a processor of a server for providing wireless services for wireless communication devices that, when executed by the processor, cause the server to:
- push to a wireless communication device an activation request to establish a wireless communication service relationship between the wireless communication device and the server, wherein the activation request is pushed from the server to the wireless communication device in absence of any prior communication being sent from the wireless communication device to the server;
- after notification that the activation request has been accepted, establish a mutually authenticated communication session between the wireless communication device and the server; and
- establish, using the mutually authenticated communication, the wireless communication service relationship between the wireless communication device and the server.

* * * * *